May 3, 1932.  J. C. MITCHELL  1,856,580
PIPE JOINT
Filed March 18, 1926
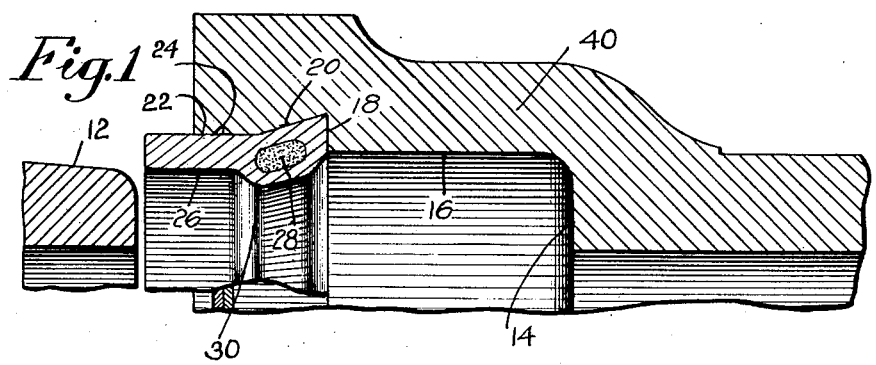
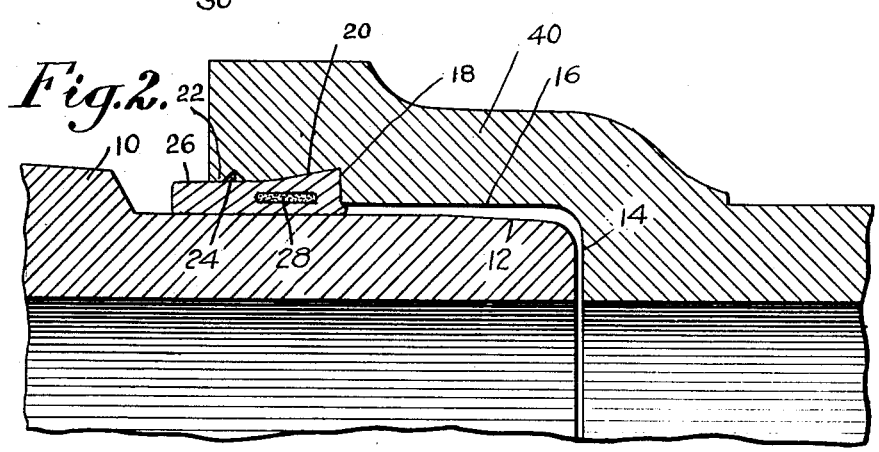
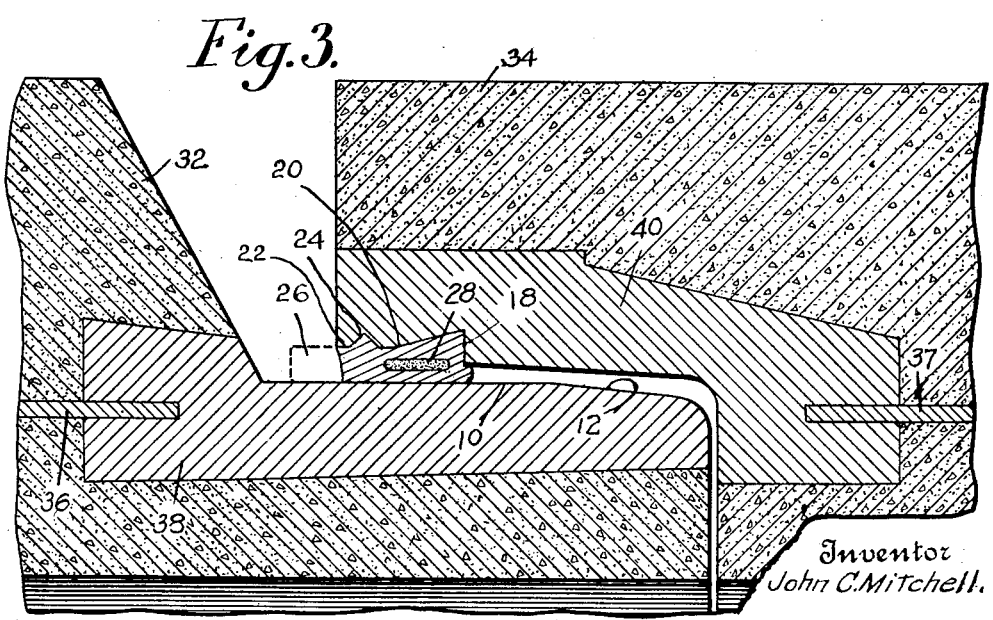
Inventor
John C. Mitchell
By his Attorneys
Cooper, Kerr & Dunham Patented May 3, 1932

1,856,580

UNITED STATES PATENT OFFICE

JOHN C. MITCHELL, OF BLOOMFIELD, NEW JERSEY, ASSIGNOR TO LOCK JOINT PIPE COMPANY, OF AMPERE, NEW JERSEY, A CORPORATION OF NEW JERSEY

PIPE JOINT

Application filed March 18, 1926. Serial No. 95,535.

This invention pertains to improvements in the pipe joint disclosed in Patent No. 1,293,615, issued February 4, 1919, to Mitchell, Bartram & Hirsh.

The joint shown in that patent comprises special forms of bell and spigot pipe ends, in combination with an annular compressible gasket which is forced into sealing relationship with the pipe ends by and during the forcible insertion of the spigot end into the bell end.

In the above disclosed structure the compressible gasket was made in the most convenient manner—by using ordinary commercial lead pipe, bought on the open market, drawing resilient fibrous material through the pipe, flattening to desired thickness, cutting to length, and fusing the ends together to form rings.

Such a method produced a serviceable and fairly satisfactory gasket, but experience has taught that for best results, under all conditions of service, the details of the joint should be modified, particularly the distribution of metal in the gasket, and it is toward such improvements that my present invention is directed.

Further and other objects and advantages will be hereinafter set forth in the accompanying specification and claims and shown in the drawings, which by way of illustration show what is now considered to be the preferred embodiment of the invention.

Fig. 1 is a sectional view showing the gasket in position in the bell of a metal pipe, before the spigot is forced to place.

Fig. 2 is the same as Fig. 1 after the joint is made.

Fig. 3 shows the joint applied to concrete pipe, after the gasket has been hand caulked.

The spigot portion of the joint comprises a cylindrical portion 10 and a tapered end portion 12. The bell portion of the joint comprises a bottom ring shaped surface 14, a cylindrical portion 16, and a gasket-receiving recessed portion which may be of any desired contour but which is shown as comprising an abutment ring surface 18 joined by a cone shaped surface 20, a cylindrical portion 22, and an annular recess 24 in surface 22.

The gasket 26 is preferably formed by an extrusion process, with substantially the cross section shown in Fig. 1. The cross section shows a substantially rectangular portion and an inclined portion. The inclined portion is of such shape as to fit into the annular conical recess formed in the pipe bell by surfaces 18 and 20. The inclined portion has approximately the same amount of metal per unit of length as the straight portion, but is provided with a flattened tubular passage parallel to the inclined walls, for the accommodation of fibrous material 28. The forming of this passage thickens the inclined portion of the gasket so that it projects, as at 30, into the path of the incoming spigot end of the next length of pipe.

The gaskets are formed by extruding metal with the above described cross section, drawing fibrous material through the hollow portion, cutting to length, and joining the ends of each length, by soldering or fusing, to form a ring of proper length for insertion as indicated in Fig. 1. As the diameter of the gasket is greater than the diameter of the mouth of the bell, it is necessary to crimp or distort the gasket from its circular shape while putting it in place.

After the spigot has been forced into the bell, the gasket assumes substantially the shape shown in Fig. 2. The shape of the precompressed ring was such as to permit the reformed material to take the shape illustrated, which is a form found highly efficient for the desired purpose. In this form the fibrous material is compressed into a comparatively long narrow cross section extending lengthwise of the pipe, and the straight portion 26 of the gasket extends towards the open end of the bell or may preferably project beyond the bell, as shown in Fig. 2.

It may sometimes happen that a joint springs a leak due, for instance, to displacement of the pipe on account of shifting supports therefor, and it then becomes important to be able to caulk the joint by hand in order to take up the leak. Such a caulking operation is impractical with the type of gasket shown in the patent above referred to, because the exposed edge of the gasket does not offer enough metal for the purpose, and because any caulking of the exposed edge might cut through the wall of the metal and allow the escape of fibrous material, thus reducing the expansive value of the fibrous core and making necessary the entire repacking of the joint.

The present design of gasket completely overcomes the above mentioned defect by providing the material 26 which may be successfully hand caulked.

The condition of the gasket after caulking is illustrated in Fig. 3, which shows a cross section of a joint of a concrete pipe. The pipe comprises the concrete sections 32 and 34, formed around steel shells 36 and 38 respectively, and in which spigot end 38 and bell end 40 are inserted, the spigot and bell ends being of metal, usually cast iron.

The gasket has been caulked until the portion which originally occupied the dotted space 26 has been compressed into the solid outline, completely filling the circumferential groove 24 provided for the purpose.

It will be noted that this gasket permits the making of a tight joint by hand caulking, even though the spigot end, gasket, and bell end are not so proportioned as to make a tight joint in the usual self-caulking manner. In other words, the gasket may be placed comparatively loosely between bell and spigot, and the joint then made tight by caulking the gasket.

In the design disclosed in the above patent, a circumferential groove was provided in the pipe bell, somewhat similar to the present groove formed by surfaces 18 and 20, but no attempt was made to fit the gasket into that groove until pressure was applied, whereupon the metal was expected to flow sufficiently to completely fill the space, which it did not always do perfectly, thereby inviting a leak at the point not properly filled. In the present design all possibility of such a defect is obviated by so forming the gasket that it fits the groove before pressure is applied.

From the above description it will be evident that my present invention discloses a design of pipe joint in which the possibility of defect is reduced to a minimum; which may be made tight by self-caulking when the spigot is forced into the bell; which may be made tight entirely by hand-caulking, or by a combination of self-caulking and hand-caulking; and which may at any time be tightened by hand-caulking.

It is to be understood that the invention is not limited to the construction herein specifically illustrated but can be embodied in other forms without departure from its spirit.

I claim—

1. A gasket for the purpose described, comprising in combination, a ring of ductile material, and a ring of resilient material imbedded therein, the thickness of the ductile material radially adjacent said resilient material being substantially less than the thickness of the ductile material elsewhere in the gasket.

2. In a pipe joint for the purpose described, an annular gasket of ductile material, the gasket having a substantially uniform volume of ductile material per unit of axial length, said material being provided with a circumferential cavity near one edge, said cavity being filled with resilient material.

In testimony whereof I hereto affix my signature.

JOHN C. MITCHELL.